United States Patent
Sharifi Mehr

(10) Patent No.: US 10,481,993 B1
(45) Date of Patent: Nov. 19, 2019

(54) DYNAMIC DIAGNOSTIC DATA GENERATION

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/296,569

(22) Filed: Oct. 18, 2016

(51) Int. Cl.
*G06F 11/30* (2006.01)
*G06F 11/07* (2006.01)
*G06F 11/34* (2006.01)

(52) U.S. Cl.
CPC ........ *G06F 11/3072* (2013.01); *G06F 11/079* (2013.01); *G06F 11/0751* (2013.01); *G06F 11/3466* (2013.01)

(58) Field of Classification Search
CPC ............. G06F 11/0778; G06F 11/0787; G06F 11/0793; G06F 11/0751; G06F 11/0757; G06F 11/0769; G06F 11/0766
See application file for complete search history.

(56) References Cited

U.S. PATENT DOCUMENTS

| | | | | |
|---|---|---|---|---|
| 7,937,623 B2 * | 5/2011 | Ramacher | ........... | G06F 11/0748 714/37 |
| 8,135,995 B2 * | 3/2012 | Ngai | ................... | G06F 11/0748 714/45 |
| 8,260,871 B2 * | 9/2012 | Fallen | ................. | G06F 11/0748 709/207 |
| 9,274,874 B1 * | 3/2016 | Chamness | ........... | G06F 11/0709 |
| 9,413,629 B2 * | 8/2016 | Harhi | ...................... | H04L 43/10 |
| 9,495,234 B1 * | 11/2016 | Hamman | .............. | G06F 11/079 |
| 2002/0157035 A1 * | 10/2002 | Wong | ................... | G06F 11/0709 714/4.11 |
| 2006/0030981 A1 * | 2/2006 | Robb | ................. | G05B 23/0229 701/31.4 |
| 2008/0065743 A1 * | 3/2008 | Kase | .................. | G05B 23/0264 709/217 |
| 2014/0059388 A1 * | 2/2014 | Patiev | ................ | G06F 11/0748 714/37 |
| 2014/0278812 A1 * | 9/2014 | Reinhold | ........... | G06Q 10/0637 705/7.36 |
| 2015/0227406 A1 * | 8/2015 | Jan | ........................ | G06F 11/079 714/37 |

* cited by examiner

Primary Examiner — Nadeem Iqbal
(74) Attorney, Agent, or Firm — BakerHostetler

(57) ABSTRACT

A computing function may be executed on a computing node by a computing services provider. Execution of the computing function may generate diagnostic information. A first set of diagnostic information may be analyzed to identify an operational state associated with an elevated risk of an error condition. The identified operational state may be mapped to a property associated additional diagnostic information that may be generated and stored in response to the identification of the operational state. Diagnostic information not associated with the operational state may be discarded.

20 Claims, 11 Drawing Sheets

DYNAMIC DIAGNOSTIC DATA GENERATION

BACKGROUND

Computing services are increasingly supplied by remotely-located providers who host various software-based services on networks of computers on behalf of clients. Although convenient for the client of such services, it may be challenging to detect or diagnose issues that may occur during the provision of the service. Various approaches to detecting or diagnosing issues may rely on the collection and dissemination of diagnostic data. For example, operational logs, performance metrics, and trace data may be collected during the provision of a computing service and subsequently reviewed. However, this data may be expensive to generate, transmit, and store.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
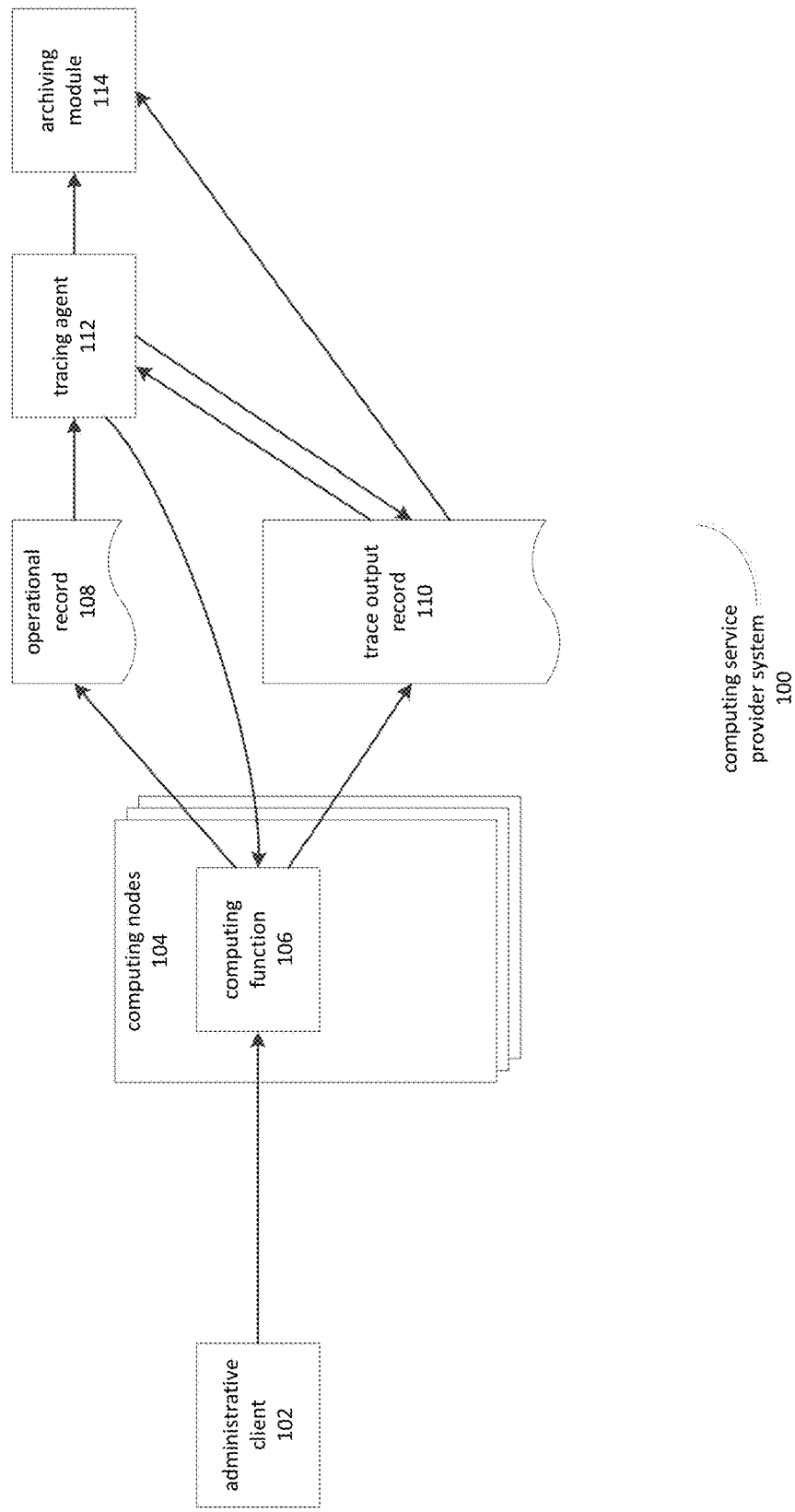
FIG. 1 is a block diagram depicting a computing service provider system.

Disclosed herein are systems, methods, and computer program products pertaining to generating and archiving diagnostic information. Various forms of diagnostic information, such as log data, performance metrics, and trace data, may be useful in detecting and diagnosing issues that may arise during the operation of a computing system. However, during normal operation of a computing system, this information may be expensive to generate, collect, and store. The systems, methods, and computer program products disclosed herein may, in various embodiments, dynamically adjust the generation, collection, and storage of diagnostic information.

A first set of diagnostic information may be monitored and analyzed to identify an operational state that may be relevant to the provision of a computing function. For example, a provider of computing services may host various computing functions on behalf of its customers. The customer or the provider may provide a set of rules for analyzing diagnostic information, such as logs or performance metrics. By applying the rules to the first set of diagnostic information, an operational state that is associated with a possible error condition may be identified. The logs or performance metrics might, for example, indicate that an exception has occurred or that the computing node on which the computing function is executed is presently overloaded. Having identified the operational state, a desired set of additional diagnostic information may be identified. For example, when the aforementioned conditions occur, it might be desired to collect additional trace data not normally generated. The operational state may be associated with an identifier or property. This identifier or property may, in turn, be used to identify a set of additional diagnostic data that may be generated and stored. The detection and diagnosis of issues may be enhanced using the additional diagnostic data. Typically, trace statements or other debugging functions may include references to these identifiers or properties, and produce diagnostic based flags or variables linked to the identifier or property. As used herein, identifiers or properties may refer to references to flags, variables, or memory locations that may be manipulated to activate or deactivate the generation of diagnostic data, or to the flags, variables, or memory locations themselves.

In an example, a system may comprise one or more processors. The system may further comprise memories which have stored thereon computer-executable instructions for identifying an operational state based on a first set of diagnostic information and activating the generation and storage of additional diagnostic information that corresponds to the operational state.

The system may, upon execution of the instructions by the one or more processors, perform operations comprising receiving a first set of diagnostic information. The first set of diagnostic information may be associated with the execution of a computing function by one or more computing nodes. The first set of diagnostic information may, for example, comprise log information or performance metrics that are, relative to the total amount of available diagnostic information, inexpensive to produce.

The system may further perform operations for determining that the first set of diagnostic information is indicative of an operational state. The operational state may, for example, be identified based on the application of a set of rules to facts derived from the first set of diagnostic information. The operational state may be indicative of an elevated risk of an error condition. For example, certain states associated with excessively high or low resource utilization might indicate that an error has or may occur, and that consequently an increased level of diagnostic information may be required.

The system may further perform operations comprising receiving a second set of diagnostic information also associated with the execution of the computing function. The second set of diagnostic information may comprise tracing data, which may for example be generated by the execution of trace functions, sometimes called trace statements, included in the code of which the computing function is comprised. These trace functions or trace statements may, in some cases, be activated in response to the identification of the operational state. Activation of the trace statements may, for example, involve mapping from the operational state to a property that is associated with the operational state. At least some of the trace statements may also be associated with the property, and these may be activated while trace statements not associated with the property are left inactive. In some cases, the additional diagnostic data may be generated but subsequently discarded when not associated with the property. Diagnostic information that is associated with the property, on the other hand, may be stored, presented to a client, or subjected to further analysis.

The operational state may be identified, in some cases, by the application of rules supplied by a customer. The system may, for example, receive a request to associate a set of rules with the computing function. The system may then apply the rules to the first set of diagnostic information in order to identify an operational state associated with an elevated risk of error. The rules may also identify the properties associated with the operational state. In some cases, a set of rules may be stored along with data describing an association between the rules and a computing function, so that the rules may be subsequently applied when the computing function is invoked, or when processing diagnostic information associated with the computing function.

FIG. 1 is a block diagram depicting a provider system. The depicted system comprises modules for dynamically adjusting the generation and/or storage of diagnostic information. A computing service provider system 100 may facilitate the provision of various computing services. The computing services may be described as computing functions and may be performed on behalf of a customer of the computing service provider system 100.

A computing function, such as the depicted computing function 106, may be operated on one or more host computing nodes 104. The computing nodes 104 may sometimes be referred to as hosts, and may include virtual machines operative on a non-virtual computing server. A computing function, such as the depicted computing function 106, may refer to programs, libraries, web pages, web-based programming interfaces, script code, procedures, and so forth. In an example embodiment, code for the computing function 106 may be provided via an administrative client 102.

In an example embodiment, the administrative client 102 may include a web-based interface generated by a server of the computing service provider system 100. The web-based interface may provide, to a customer of the computing service provider system 100, various interfaces and control mechanisms related to the computing function 106 that is performed on behalf of the customer.

The administrative client 102 may, in various embodiments, provide access to diagnostic information related to the provision of the computing function 106. In some instances, the diagnostic information may be stored for subsequent retrieval by the administrative client 102. In other instances, the diagnostic information may be presented to the user through various means, such as real-time displays of trace output, statistical analysis, and so forth.

As noted, the computing function 106 may be supplied by the administrative client 102. The computing function 106 may perform various functions on behalf of a customer of the computing service provider system 100. In an example, the computing function 106 may be hosted by the computing service provider system 100, on computing nodes 104, on behalf of the customer. The computing function 106 may, in some instances, be executed in response to a request by a third party. For example, the computing function 106 might comprise script code for generating a web page for an online store operated by the customer.

The operation of the computing function 106 may be associated with the generation of a variety of diagnostic information. Examples of diagnostic information include, but are not limited to, performance metrics, log information, and trace data. Performance metrics may include, but are not limited to, records related to the operation of the host computing nodes 104. For example, metrics for the host computing nodes 104 may include, but are not limited to, records of central processing unit ("CPU") utilization, network bandwidth utilization, memory utilization, and so on. Log data may refer to data generated during the operation of the computing nodes 104 or by the execution of a computing function, such as the depicted computing function 106. For example, a log record may be generated once for each time the computing function 106 is executed.

One or more of the performance metrics, log records, or other data may make up an operational record 108 of the computing function 106. The operational record 108 may comprise diagnostic information collection during operation of the computing nodes 104 in association with the provision or execution of the computing function 106. The set of diagnostic information stored in the operational record 108 may, for example, be indicative of the computing environment in which the computing function 106 will be executed or indicative of the computing environment while the computing function 106 is executed.

In an example, the operational record 108 comprises information indicative of the capacity of the computing nodes 104 to perform the computing function 106. In another example, the operational record 108 comprises information indicative of a potential fault of the computing nodes 104. In another example, the operational record 108 may comprise information indicative of an exception or other fault encountered during execution of the computing function 106. Note that in some cases, the operational record 108 may consist of data generated during a particular instance of executing the computing function 106. The operational record 108 may also, in some cases, comprise information collected at other times, or for prior instances of executing the computing function 106.

Another type of diagnostic information may be described as trace data. In FIG. 1, trace data is depicted as being generated and sent as a trace output record 110. The trace output record 110 may comprise information similar to, or in some cases identical to, the operational record 108. Trace data may refer to diagnostic information that is typically voluminous, expensive to generate, expensive to transmit, or expensive to store.

On example of trace data is data generated via statements executed by the computing function 106. These may be referred to a trace statements, debug statements, print lines, print statements, console output, and so forth.

Because trace data is typically voluminous or otherwise expensive in terms of processor, storage, or network utilization, a typical practice involves eliminating such statements from production code. However, as described herein, it may be beneficial to include such statements in production code, and to employ techniques presented herein for controlling generation, transmission, persistence, and presentation of trace data.

The tracing agent 112 may monitor the operational record 108 of the computing nodes 104 and computing function 106. The monitoring may comprise receiving the diagnostic data contained in the operational record 108, parsing it, an applying a set of rules to the data to identify an operational state. The operational state may, for example, correspond to events or situations that may be of interest during investigation, diagnosis, or repair. The tracing agent 112, having identified the operational state by application of the rules, may map from the identified operational state to a set of desired trace output.

The trace output record 110, as noted, may potentially contain voluminous data or data that is expensive in some way to generate, transmit, or store. The tracing agent 112, having identified an operational state associated with a set of desired trace output, may cause a selected subset of trace data to be generated, transmitted, or stored.

In an example, the tracing agent 112 may identify one or more properties associated with the identified operational state. The properties may sometimes be referred to as tags, categories, or priority levels. For example, trace data is sometimes categorized according to levels such as "low," "medium," or "high." Similarly, trace data may be categorized as "informational," "warning," and "error." The lower levels, such as "low" or "informational" data, may be of interest when diagnosing a problem, but may be voluminous or expensive to generate, transmit, or store.

The tracing agent 112 may identify properties associated with the operational state and map those to the set of desired trace output. For example, the operational state may have been identified, based on the operational record 108, as being related to an error or fault condition. This operational state may be mapped to properties such as "low," "medium," and "high" (in combination), indicating that all available trace data is to be saved when the operational state corresponds to the error or fault condition.

The tracing agent 112 may, in some cases, instruct the computing function 106 to output trace data corresponding to the identified properties. Thus, when the operational state is detected in the operational record 108, the tracing agent 112 may cause the computing function 106 to begin outputting trace data corresponding to the identified properties.

The tracing agent 112 may, in some cases, instruct the archiving module 114 to limit archiving of trace data in the trace output record 110 to data that is associated with the identified set of properties.

The tracing agent 112 may, in some cases, cause network transmission of trace data to be limited to data that is associated with the identified set of properties.

Operations for causing generation, transmission, and storage of the trace data may, for example, comprise sending instructions to the computing nodes 104 to reconfigure execution of the computing function 106 so that trace statements in the computing function 106 generate trace data corresponding to the identified set of properties. A trace statement may, generally speaking, consist of two portions. A first portion of a trace statement may consist of an "IF" statement that tests to see a current state is indicative of producing a certain level of output. The second portion may output trace data when the "IF" condition is satisfied. For example, a trace statement might appear, in a hypothetical source code, as "TRACE("MEDIUM", "X=1")". This might indicate that the trace data "X=1" should be output whenever the current trace level is indicative of outputting medium-level trace data. It will be appreciated that more complex scenarios may also be supported. For example, the trace statement "TRACE("HIGH–CPU"||"LOW–RPS", "X=1")" might indicate that the trace data "X=1" should be output whenever CPU utilization is high or requests-per-second ("RPS") are low. The computing node 200 may, when instructed by the tracing agent 112, modify the variables tested by the "IF" condition, so that the second portion of the trace statement is executed and the desired trace data is generated.

The archiving module 114 may be similarly configured by the tracing agent 112. The archiving module 114 may receive trace data by accessing the trace output record 110. Entries in the trace output record may be associated with various properties, such as "HIGH," "MEDIUM," or "LOW." The archiving module 114 may compare these properties to a list of properties provided by the tracing agent 112. When trace data is associated with a property on the list, the archiving module 114 may cause the trace data to be stored. Similar approaches may be employed for data that is to be presented to a user, analyzed, or otherwise processed.

Figure 2:
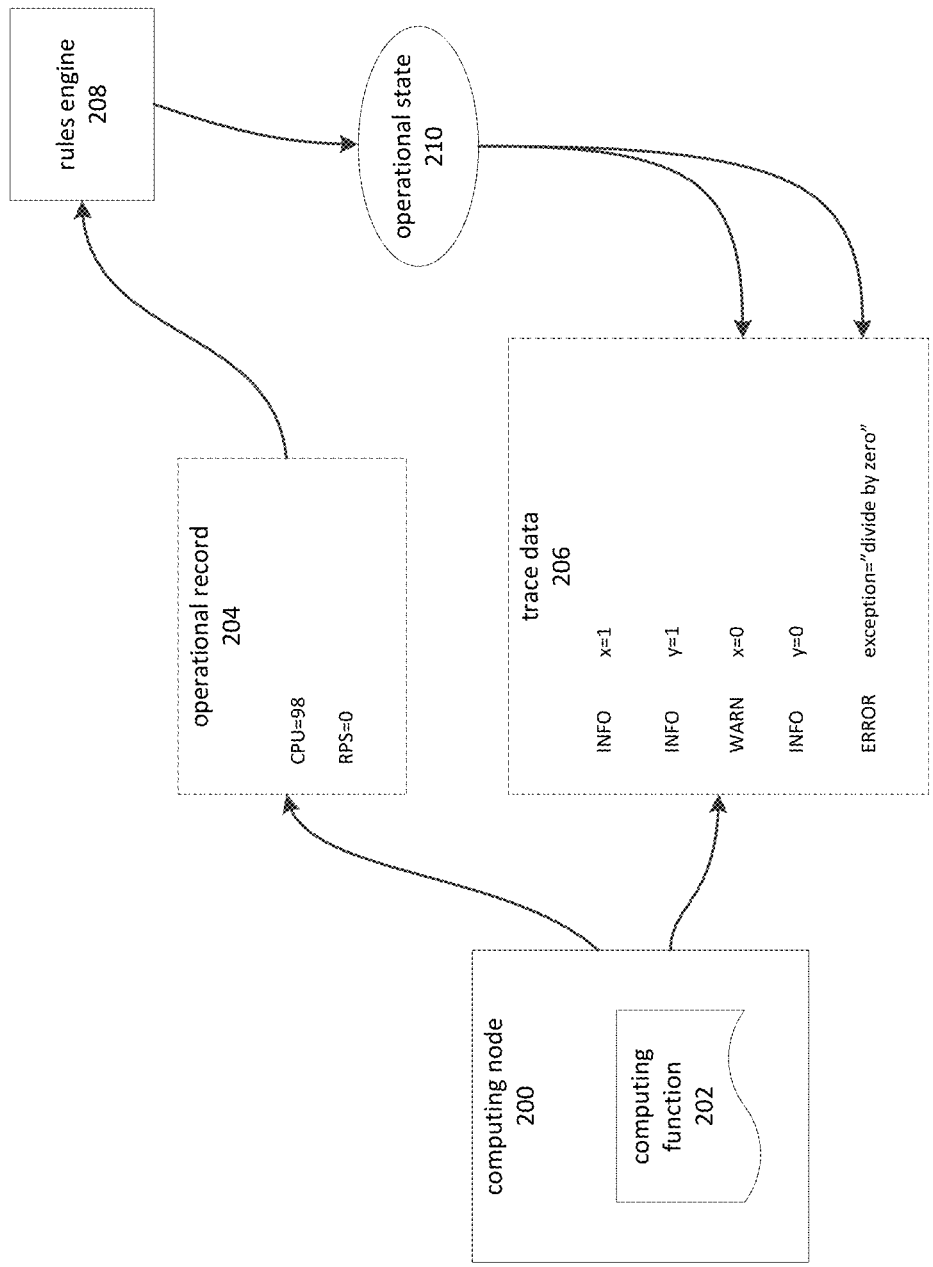
FIG. 2 is a block diagram depicting determination of an operational state and mapping from the operational state to a subset of diagnostic information.

The operation of the tracing agent 112 may be further understood in view of FIG. 2, which is a block diagram depicting determination of an operational state and mapping from the operational state to a subset of diagnostic information.

The computing node 200 may execute or otherwise perform a computing function 202. The computing node 200 and the computing function 202, when executed on the computing node 200, may generate an operational record 204 comprising various pieces of diagnostic information. The computing function 202 may comprise trace statements that conditionally generate diagnostic information, based on evaluation of properties linked to or otherwise associated with each trace statement. In comparison to the diagnostic data of the operational record 204, the trace data 206 may be relatively voluminous or otherwise expensive to generate, transmit, or store.

In the example of FIG. 2, the operational record 204 may comprise information indicative of a current level of CPU utilization and a current measure of requests-per-second. These examples are intended to be illustrative, and should not be construed as limiting. The operational record 204 may refer to any set of data from which an operational state may be determined and used in accordance with the present disclosure.

The rules engine 208, which may be a component of the tracing agent 112, may apply a set of rules to the operational record 204 in order to identify an operational state. For example, a rule might comprise the logical expression "CPU>75||RPS<10" to describe a particular operational state 210. The rule might also provide a mapping from that operational state to a desired set of diagnostic output. For example: "CPU>75||RPS<10=>("WARN," "ERROR")" might be a rule indicating that WARN and ERROR level trace data should be output whenever CPU utilization rises above 75% or RPS falls below 10 requests per second. FIG. 2 thus depicts the operational state 210 being mapped to the "WARN" and "ERROR" level elements of trace data 206. Referring back to the example of FIG. 1, the tracing agent 112 might configure computing node 200 to cause the "WARN" and "ERROR" level trace statements to be fully executed each time computing function 202 is executed, provided that at least one of the two characteristics of the example operational state remains true, i.e. that CPU utilization is above 75% or RPS is below 10.

The computing node 200 may comprise memory locations in which state information pertinent to a set of properties is maintained. For example, the computing node 200 may store a bit field where each bit represents a property that may be marked as enabled or disabled. A given trace statement may be associated with a property. When the trace statement is executed, it may first test the bit field, at a location corresponding to the property, to determine whether or not the trace data should be generated. Modification of the bit field may therefore alter the set of diagnostic information that is produced.

The trace data 206 which FIG. 2 depicts is intended to represent an example embodiment in which computing function 202 comprises five trace statements, three of which are associated with the "INFO" property, one of which is associated with the "WARN" property, and one of which is associated with the "ERROR" property. A bit array or other structure maintained by the computing node 200 may determine which, if any, of these trace statements is fully executed, so that the corresponding trace data is generated, each time the computing function 202 is executed.

The operational record 204 may, in some instances, be correlated with the trace data 206. Correlation may involve determining that the operational record 204 is associated with either or both of the computing function 202 and the trace data 206. The association may be based on the source of the operational record 204 (e.g. computing node 200), the time at which the data in the operational record 204 was collected, whether the data was collected during execution of the computing function 202, and so on.

Figure 3:
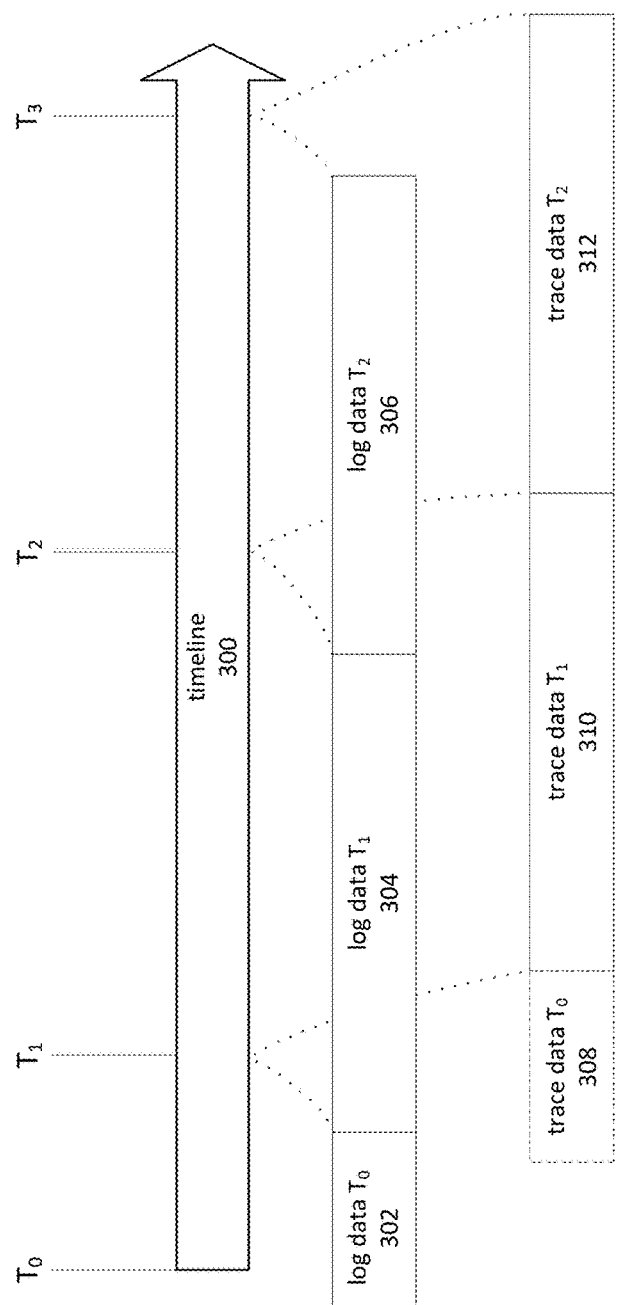
FIG. 3 is a block diagram depicting an example of correlating diagnostic information.

FIG. 3 is a block diagram depicting an example of correlating diagnostic information. In the example of FIG. 3, a timeline 300 represents the passage of time with respect to a sequence of events $T_0$, $T_1$, and $T_2$. The time $T_0$ may represent a time at which data collection and data monitoring begins. The time $T_1$ may represent a time at which a computing function is invoked. The time $T_2$ may represent a time at which an operational state is detected, and time $T_3$ may represent a time at which the detected operational state ends.

During the initial period beginning at $T_0$, log data $T_0$ 302 may be monitored to identify a time $T_1$ at which a computing function is invoked. During this time, trace data $T_0$ may not be generated, or may be generated based on previous invocations of the computing function, or be related to the general operation of a computing node that hosts the computing function.

At the time $T_1$, monitoring of the log data $T_0$ 302 may result in a determination that a computing function has been invoked. A set of rules correlated to the computing function may then be applied to the log data $T_1$ 304 to identify any operational states that would trigger a modification of the generation or storage of the trace data.

Specifically, at time $T_2$ monitoring of the log data $T_1$ 304 may result in a determination that an operational state exists. Prior to this time, the trace data $T_1$ 310 that is generated or stored may consist of a default set of trace data. Typically, the default corresponds to a reduced amount of data.

When the operational state is detected at time $T_2$, the generation or storage of trace data $T_2$ 312 may be modified to be consistent with the operational state. Thus, in response to the identification of the operational state based on log data $T_1$, 304 a tracing agent may cause execution of the computing function to generate the trace data $T_2$. The trace data $T_2$ 312 may comprise trace data having properties associated with the identified operational state.

Monitoring of log data $T_2$ 306 may result in a determination, at time $T_3$, that the operational state has been exited. For example, if the operational state pertained to CPU utilization rising above a threshold level, the log data $T_2$ 306 might indicate that, at time $T_3$, the CPU utilization had dropped below the threshold. The generation or storage of trace data might then be modified again, for example by reverting to the default set of data.

Although FIG. 3 describes correlating diagnostic information based on time, other aspects in additional to or instead of time may be used. For example, correlation may be based on invocation of a computing function, such that a first set of diagnostic information generated during a first instance of executing a computing function is correlated to a second set of diagnostic information generated in the same period. In another example, the first set of diagnostic information generated during the first instance of executing the computing function may be correlated to subsequent invocations of the computing function. The correlation, in this case, may continue indefinitely or for a threshold number of invocations. For example, an operational state detected during the first invocation may be used to control diagnostic output of the next N invocations of the same computing function.

Figure 4A:
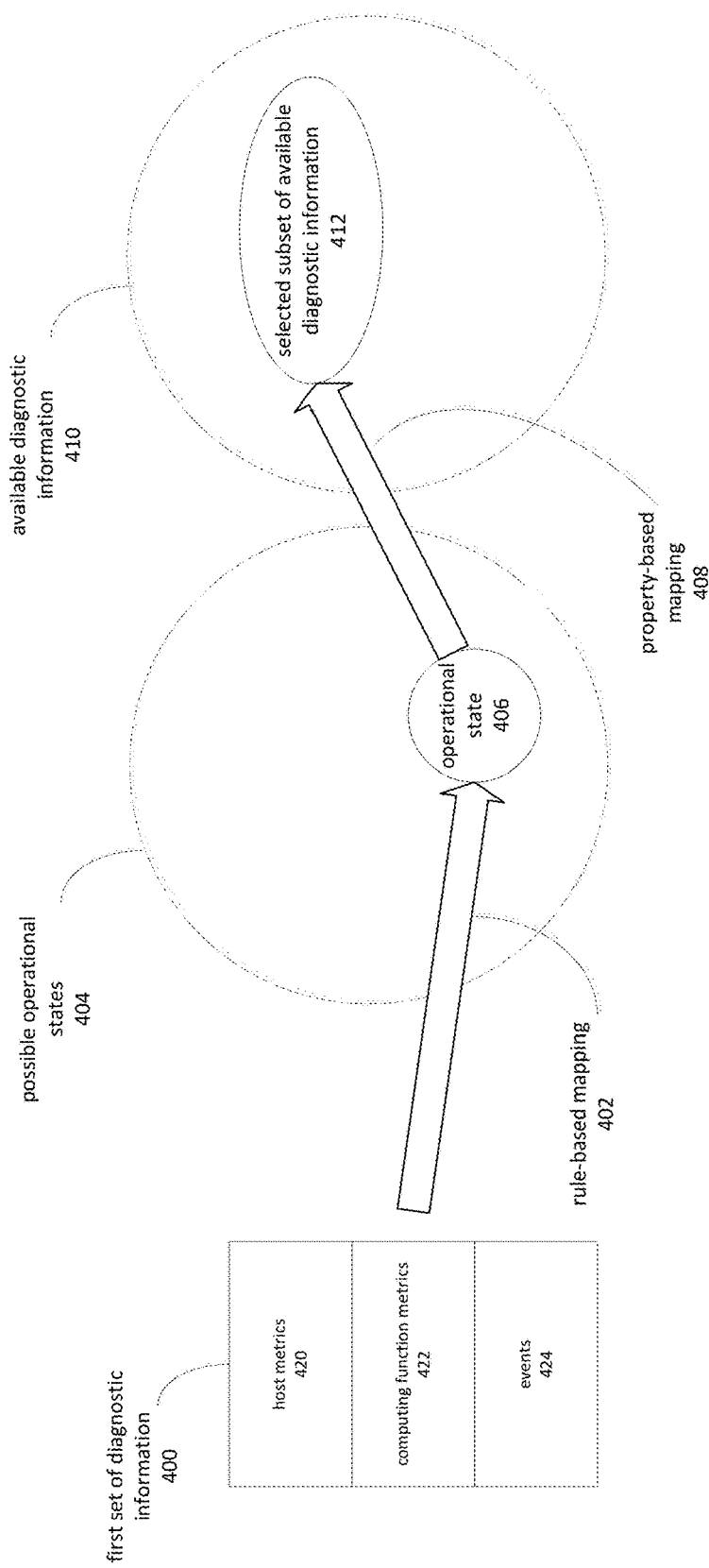
FIG. 4A is a block diagram depicting a process for activating a subset of available diagnostic information.

FIG. 4A is a block diagram depicting a process for activating a subset of available diagnostic information. The process depicted by FIG. 4A may involve a process of mapping from a first set of diagnostic information 400 to a selected subset 412 of available diagnostic information 410. The selected subset 412 may be activated, such that it is generated by trace statements of a computing function and then either stored, presented to a user, or analyzed.

The first set of diagnostic information 400 may correspond to a monitored subset of diagnostic information. For example, as explained herein, diagnostic information such as CPU, network, or memory utilization may be monitored, as may the entries of log files. More generally, the first set of diagnostic information 400 may consist of any sort of information to which rules might be applied. Examples of diagnostic information 400 include, but are not limited to, host metrics 420, computing function metrics 422, and events 424.

The second set of available diagnostic information 410 may correspond to various combinations of available diagnostic information. Here, "available" refers to diagnostic information which may be generated or which has been generated in relation to the performance of a computing function. For example, a conditionally executed trace statement may be considered available, as would trace statements that are unconditionally generated.

A rule-based mapping 402 may be applied to the first set of diagnostic information 400 in order to map to an operational state 406 of some number of possible operational states 404. An The operational state 406 may thus correspond to a condition in which a rule, of a set of rules, has been matched to a set of facts observed in the first set of diagnostic information 400.

The identified operational state may then be mapped, by a property-based mapping 408, to a selected subset of available financial information 412. The mapping may involve properties associated with the operational state 406. For example, a rule "CPU>90=>(INFO, WARNINGS, ERRORS)" might define the operational state of CPU>90 and associate it with the properties INFO, WARNINGS, and ERRORS. Of the available diagnostic information 410, the diagnostic information in the selected subset 412 may be that which is associated with at least one of the properties INFO, WARNINGS, or ERRORS.

Figure 4B:
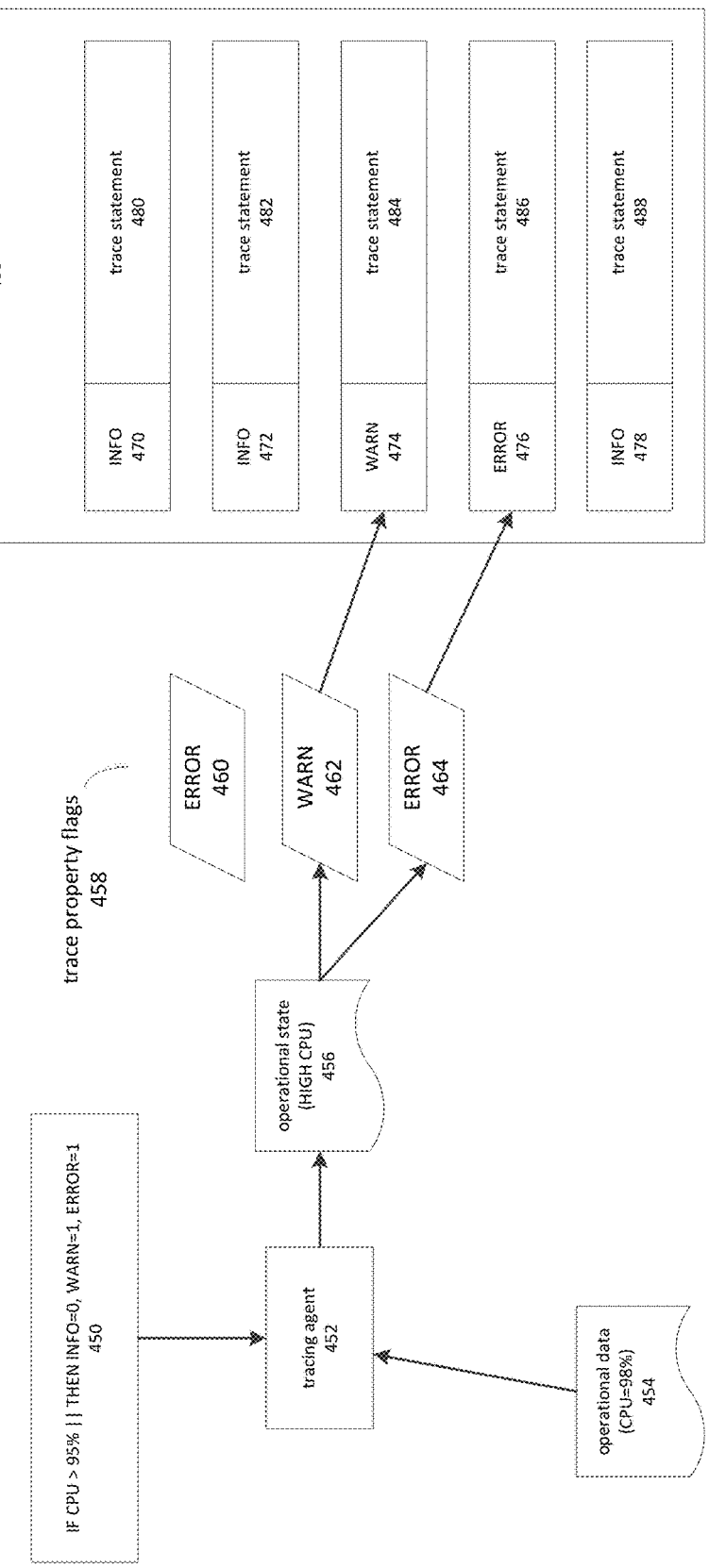
FIG. 4B is a block diagram depicting further aspects of a process for activating a subset of available diagnostic information.

FIG. 4A may be further understood in view of FIG. 4B, which is a block diagram depicting further aspects of a process for activating a subset of available diagnostic information. A rule 450 may map from condition ("CPU>95%") to an operational state 456 ("HIGH CPU"). The rule 450 may also specify that the operational state 456 of "HIGH CPU" is associated with activating the set of trace properties WARN and ERROR, while INFO either remains de-activated or is de-activated. The tracing agent 452 may apply operational data 454 ("CPU=98%") to determine that the rule's 450 condition equates to the operational state 456 of "HIGH CPU." The tracing agent 452 may further cause the manipulation of one or more trace property flags 458, so that the trace statements 484, 486 associated with the WARN and ERROR trace properties 474, 476 to be activated.

The computing function 466 may comprise computer-executable instructions which may perform the operations of the computing function 466. The operations may include execution of trace statements 480-488 for corresponding trace properties 470-478 that have been activated. Typically, each of the trace statements 480-488 may evaluate a conditional statement, such as an "if . . . then . . . " statement, to check the value of a trace property flag 458 that corresponds to a trace property 470-478 that is associated with the trace statements 480-488. If the condition evaluates to true, e.g. when the corresponding trace property flag 458 is "on," the corresponding trace statement 480-488 may generate trace data.

Figure 5:
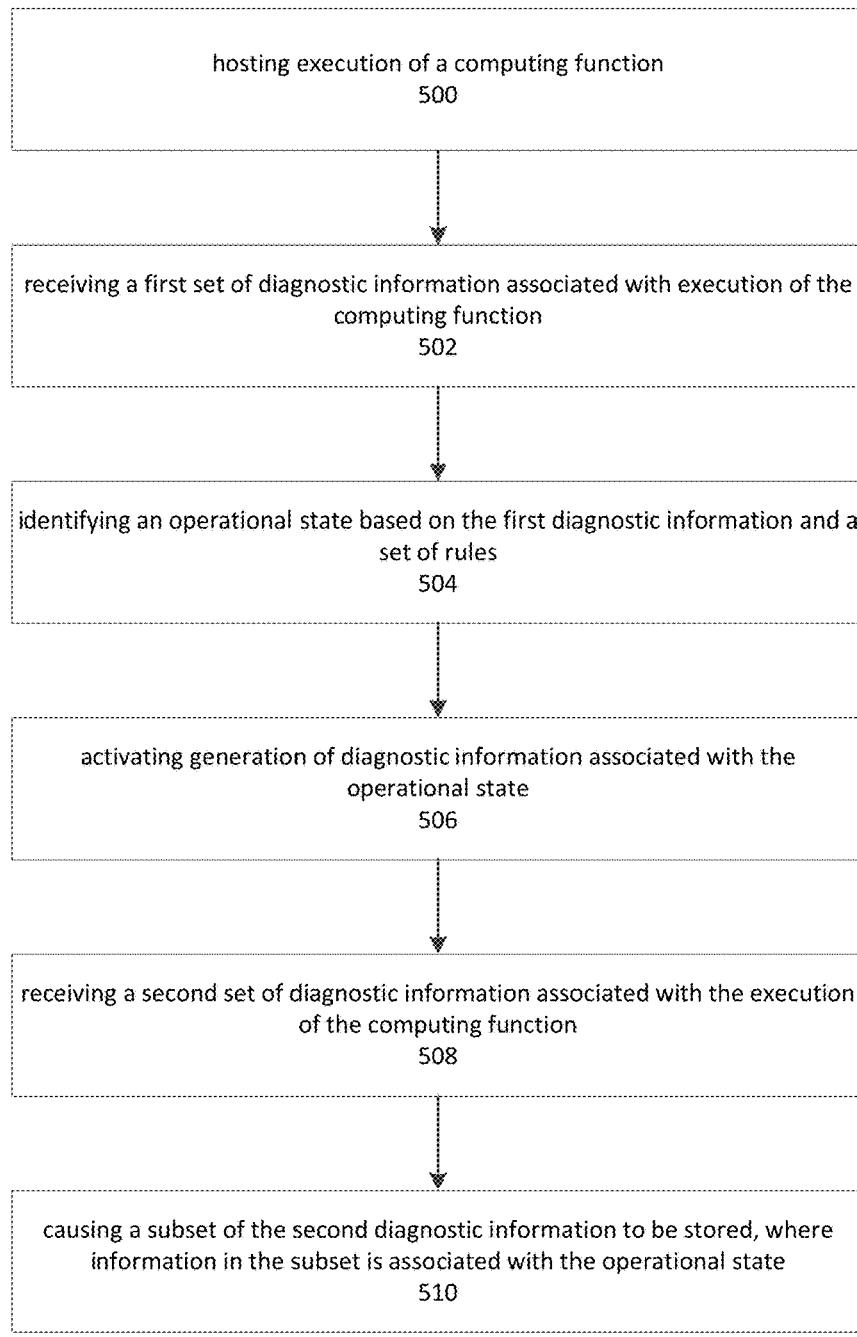
FIG. 5 is a flow diagram depicting an example process for selectively collecting a subset of available diagnostic information.

FIG. 5 is a flow diagram depicting a process for selectively collecting a subset of available diagnostic information. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 500 depicts hosting execution of a computing function. This may comprise operating a computing node on which the computing function executes. As described herein, the computing function may refer to executable or interpreted code, page markup data, and so forth. Executing the computing function may therefore comprise causing the executable or interpreted instructions to be executed, rendering the page markup data, and so on.

The computing function may be linked to a set of rules used to identify operational states. A client device or administrative interface may, for example, be provided to accept data describing the set of rules to be linked to the computing function. In some instances, the computing function itself may identify the applicable rules. In some instances, a client associated with the computing function may provide a callback function, or some other similar function or procedure, for providing an applicable set of rules. The callback function may be invoked, for example, just prior to the execution of the computing function.

Block 502 depicts receiving a first set of diagnostic information. The first set of diagnostic information may be associated with the execution of the computing function. The diagnostic information may pertain to the host computing node generally, or specifically to data generated during execution of the computing function.

Block 504 depicts identifying an operational state based on the first diagnostic information and a set of rules. The set of rules may be provided by the customer and associated with the computing function. The set of rules may, for example, contain Boolean expressions that may be evaluated based on facts obtained by parsing or otherwise extracting information from the first set of diagnostic information. The Boolean expression may be further associated with a property or other identifier that may be used to ascertain which diagnostic information is associated with the operational state.

Association between the first diagnostic information and the execution of the computing function may refer to diagnostic information relevant to the determination of an operational state. The first diagnostic information may, for example, be associated with the execution of the computing function when it pertains to the health of the computing node on which the computing function executes. The first diagnostic information may also be associated with the computing function because it directly pertains to its execution, or is collecting during the execution of the computing function. Examples include system performance metrics collected during the execution of the computing function, or diagnostic information generated by the computing function itself.

In some embodiments, a callback function may be invoked in response to the identification of an operational state. The callback function may, in some cases, perform a confirmation of the operational state based on further analysis of the data. The callback function may, in some cases, determine one or more properties that should be associated with the operational state. In an example, a callback function may count the number of times it has been invoked, and pick one of a low, medium, or high level of diagnostic information based on the number of times an operational state has been identified. A frequently occurring exception, for example, might be associated by the callback function with a property indicative of a high level of diagnostic output.

Block 506 depicts activating the generation of diagnostic information that is associated with the operational state. This may, for example, comprise sending instructions to a computing node on which the computing function is executed. The instructions may identify a property associated with the operational state and indicate that trace output associated with the property should be generated. Similarly, instructions may be sent in response to determining that the computing node is no longer in a previous operational state, and indicating what properties were associated with the no-longer-applicable operational state. In this manner, previously activated trace statements may be turned off, and trace statements relevant to the current operational state may be turned on.

Block 508 depicts receiving a second set of diagnostic information. The second set of diagnostic information may be associated with the execution of the computing function. For example, the second set of diagnostic information may comprise trace statements that are, or that may be executed, during the execution of the computing function. As noted, in some cases the diagnostic information associated with the operational state may be generated, while diagnostic information not associated with the operational state is not generated. In other cases, however, the diagnostic information received during the operations depicted by block 508 may be Block 510 depicts causing a subset of the second diagnostic information to be collected and stored. The information that is stored may be that which is associated with the operational state. Information not associated with the operational state may be discarded. As described herein, association with the operational state may be determined via association with a property that is itself associated with the operational state. For example, an operational state defined by low network utilization may be associated with a "MEDIUM" level of trace output, such that trace output tagged with the "MEDIUM" identifier is stored, while trace output tagged with the "LOW" level is discarded.

Figure 6:
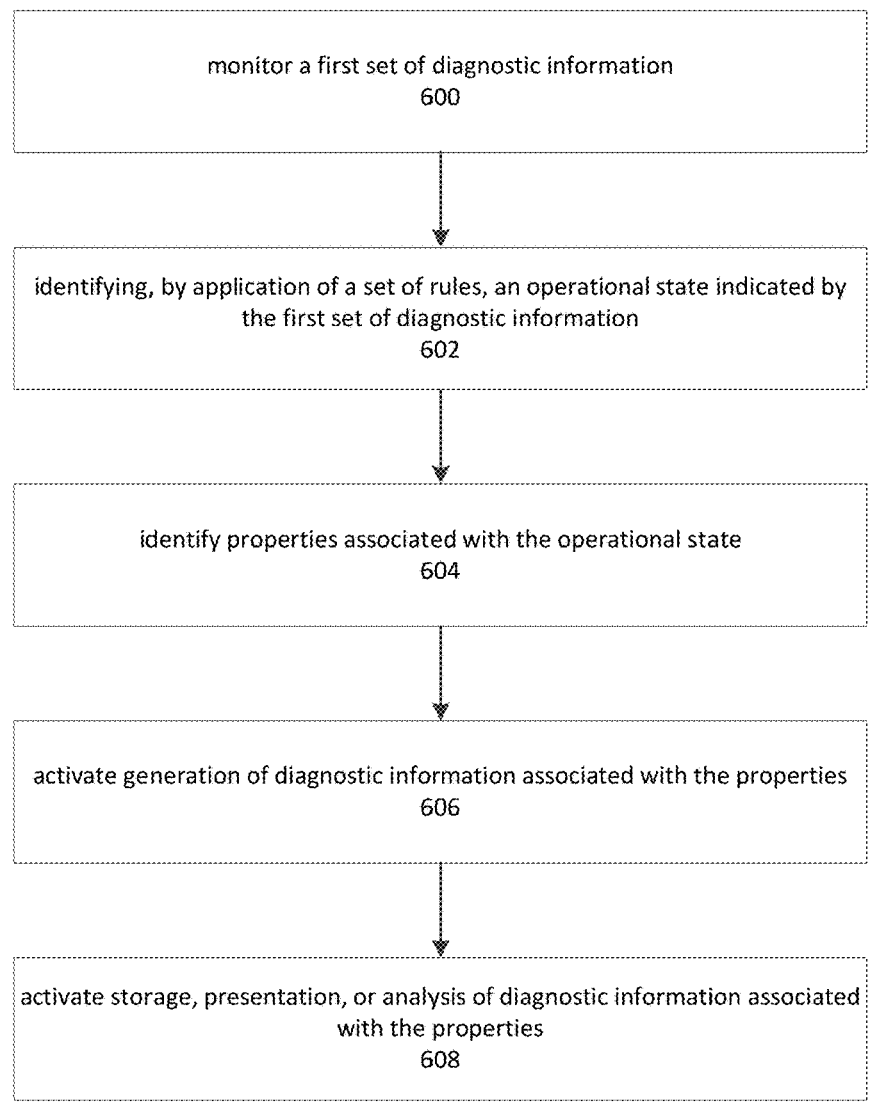
FIG. 6 is a flow diagram depicting an example process for activating collection of a subset of available financial information.

FIG. 6 is a flow diagram depicting a further process for activating collection of a subset of available financial information. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 600 depicts monitoring a first set of diagnostic information. A tracing agent, such as the tracing agent 112 depicted in FIG. 1, may receive the diagnostic information on an ongoing basis. The first set of diagnostic information may therefore be limited to that which is necessary for identifying operational state(s), although there is no requirement that the information be limited in this way.

Block 602 identifying an operational state by applying a set of rules to the first set of diagnostic information. Then, as depicted by block 605, the tracing agent 112 may identify properties associated with the operational state.

Block 606 depicts activating the generation of diagnostic information that is associated with the identified properties. This may comprise sending instructions to computing nodes on which the computing function is executed. The instructions may comprise identifiers of properties associated with the operational state, and an indicator of whether trace statements associated with the property should be turned on or off. When the property is associated with a currently applicable operational state, the instructions would indicate that trace statements associated with the property should be turned on, i.e. that they should be activated.

Block 608 depicts activing the storage, presentation, or analysis of diagnostic information that is associated with the identified properties. In other words, the tracing agent 112 may cause diagnostic data associated with the current operational state to be subject to further processing. In an example, the processing may comprise archiving the data for later retrieval. In another example, the processing may comprise sending the data to the customer. In another example, the data may be presented to the customer via a web application. In some cases, the data may be analyzed and a possible cause of the operational state suggested via the web application.

Figure 7:
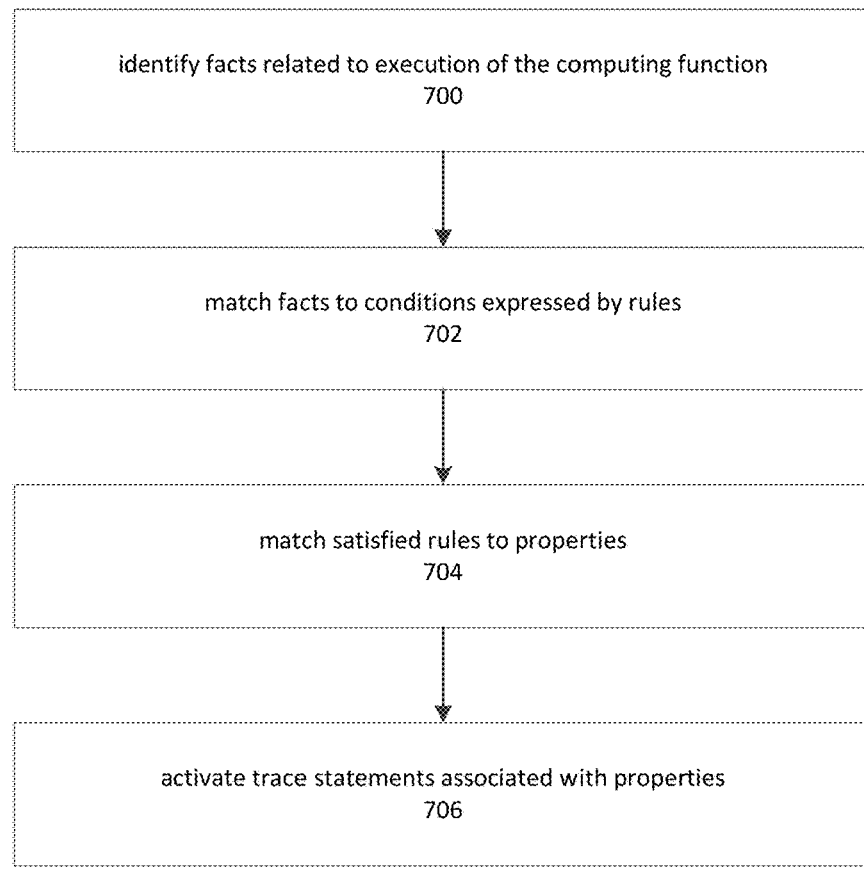
FIG. 7 is a flow diagram depicting an example process for identifying an operational state.

FIG. 7 is a flow diagram depicting an example process for identifying an operational state. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 700 depicts identifying facts related to the execution or provision of a computing function. This may, for example, comprise parsing a first set of diagnostic information and obtaining information relevant to the set of rules. These facts may then be matched to conditions expressed in the set of rules, as depicted by block 702.

Block 704 depicts matching rules that have been satisfied, upon application of the observed facts, to one or more properties. The conditions expressed in the rules may be evaluated, and if true one or more properties associated with the rule may be identified. Then, as depicted by block 706, trace statements that are associated with the properties may be activated.

In an example embodiment, the steps described by FIGS. 6-7 may be performed by the tracing agent 112, as depicted in FIG. 1. Note, however, that in some instances the tracing agent 112 may be combined with one or more of the computing nodes 104, such that the tracing agent 112 operates on the same physical, and in some cases virtual, host as the computing nodes 104. In some cases, the tracing agent 112 may be integrated into the process in which the computing function 106 executes.

Figure 8:
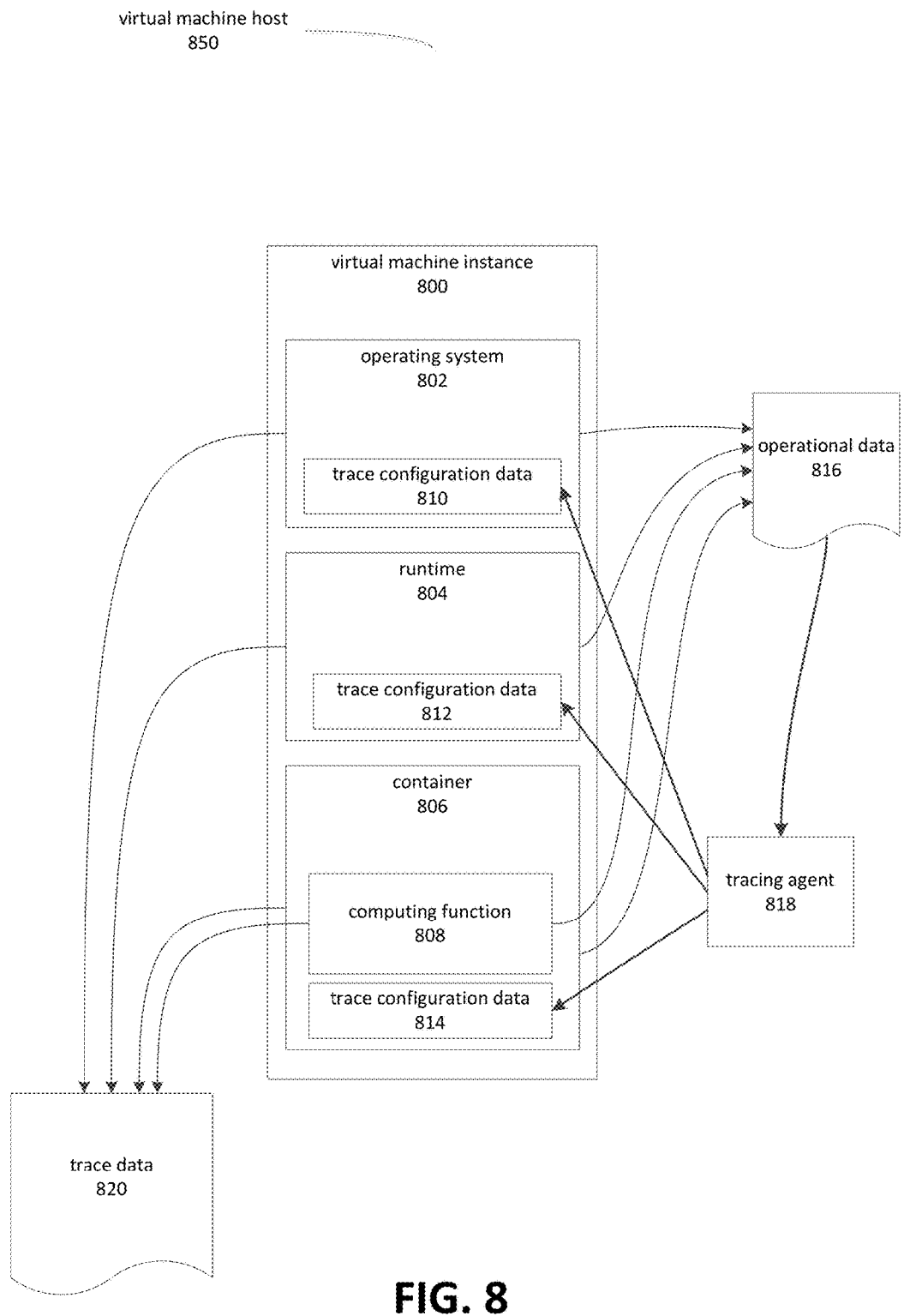
FIG. 8 is a block diagram depicting an example of a virtual machine host with dynamic generation of diagnostic information.

FIG. 8 is a block diagram depicting an example of a virtual machine host with dynamic generation of diagnostic information. A virtual machine host 850 may comprise virtual machine instances, such as the depicted virtual machine instance 800, one which computing functions, such as the depicted computing function 808, are executed. A system for executing computing functions may rely on a plurality of virtual machine hosts, each of which may host a plurality of virtual machines. For clarity regarding the depiction of dynamic generation of diagnostic information, FIG. 8 depicts a single virtual machine host 850 and virtual machine instance 800.

A computing function 808 may be submitted by a client and assigned to the virtual machine instance 800 for execution. The virtual machine instance 800 may instantiate a container 806 in which the computing function 808 may execute. The operation of the container may be supported by the operating system 802 and runtime 804 of the virtual machine instance 800. The container 806 may, in some instances, be an isolated sub-environment of the virtual machine instance 800. For example, the container 806 may permit the computing function 808 to execute with a reduced possibility of damaging the operation of the operating system 802 or runtime 804 of the virtual machine instance 800, or of other containers that may operate in the virtual machine instance 800. In some instances, the container 806 may comprise an operating system and/or runtime that are independent of the operating system 802 and runtime 804 of the virtual machine instance 800.

Code for the computing function 808 may be uploaded to a computing service provider, such as the computing service provider system 100 that is depicted in FIG. 1. The computing service provider system 100 may maintain associations between the computing function 808 and configuration information, such as a name, description, entry point, and system requirements of the computing function 808.

Code for the computing function 808 may be written to be independent of the underlying computing infrastructure in which the computing function 808 will execute. The code for the computing function 808 may also be written as a stateless function. The computing function 808 may, for example, be written as a lambda function around which an execution environment may be constructed.

In an example, execution of the computing function 808 may be triggered by any of a variety of mechanisms. When the computing function 808 is triggered, code for the computing function 808 may be loaded into the memory of the virtual machine instance 800. The container 806 may be instantiated or allocated for executing the computing function 808. The characteristics of the container 806 may be based on the information associated with the computing function 808, including any system requirements that may be associated with the computing function 808. For example, any libraries required for execution may be loaded into the container 806 prior to execution of the computing function 808. The computing function 808 may then execute. Side-effects of the execution may be limited to the container 806, and may be discarded after each execution of the computing function 808. Any side-effects intended to be persisted may be directed to additional services, such as a database service or storage service. For example, if the computing function 808 generates a file, that file might be stored using hosted file storage service. After the computing function 808 has completed execution, the container 806 may be discarded or deallocated for use by another function.

Prior to execution of the computing function 808, the virtual machine instance 800, operating system 802, runtime 804, and/or container 806 may be configured to capture diagnostic information associated with the execution of the computing function 808. In some embodiments, the operational data 816 and/or trace data 820 may be persisted to a database service or a storage service.

Components of the virtual machine instance 800 may generate operational data 816. The components that may generate operational data 816 include, but are not limited to, the operating system 802, runtime 804, container 806, and computing function 808. The operational data 816 may comprise various metrics that pertain to the operation of these components and may be used to identify an operational state.

The virtual machine host 850 may comprise a tracing agent 818 that receives and processes the operational data 816. The tracing agent 818 may, for example, monitor the operational data 816, apply a set of rules to determine an operational state corresponding to the operational data 816, identify properties of trace statements associated with the operational state, and send instructions for modifying trace configuration data 810-814 in accordance with the identified properties.

In some instances, the tracing agent 818 may operate outside of the virtual machine host 850. For example, the tracing agent 818 might be an operable component of a control plane or network management device which is in communication with the virtual machine host 850.

Having identified an operational state and a set of properties corresponding to the operational state, the tracing agent 818 may store information corresponding to those properties in trace configuration data 810-814. The tracing agent 818 may, in some instances, map from the properties to other data that may be stored or manipulated in the trace configuration data 810-814 to produce trace data 820 that may be useful in identifying issues associated with the operational state. The tracing agent 818 may, for example, identify a first set of properties of the OS 802 that are associated with operating system 802 trace statements deemed relevant to the identified operational state, and then cause the trace configuration data 810 of the operating system 802 to be modified so that trace statements with those properties are activated.

By modifying the trace configuration data 810-814, the tracing agent 818 may cause the operating system 802, runtime 804, container 806, and computing function 808 to output a set of trace statements that may be helpful in diagnosing an issue related to the identified operational state. The trace data 820 may then be processed by an archiving module or other component, and may in some instances be sent to or presented to a client of the computing function's provider.

Figure 9:
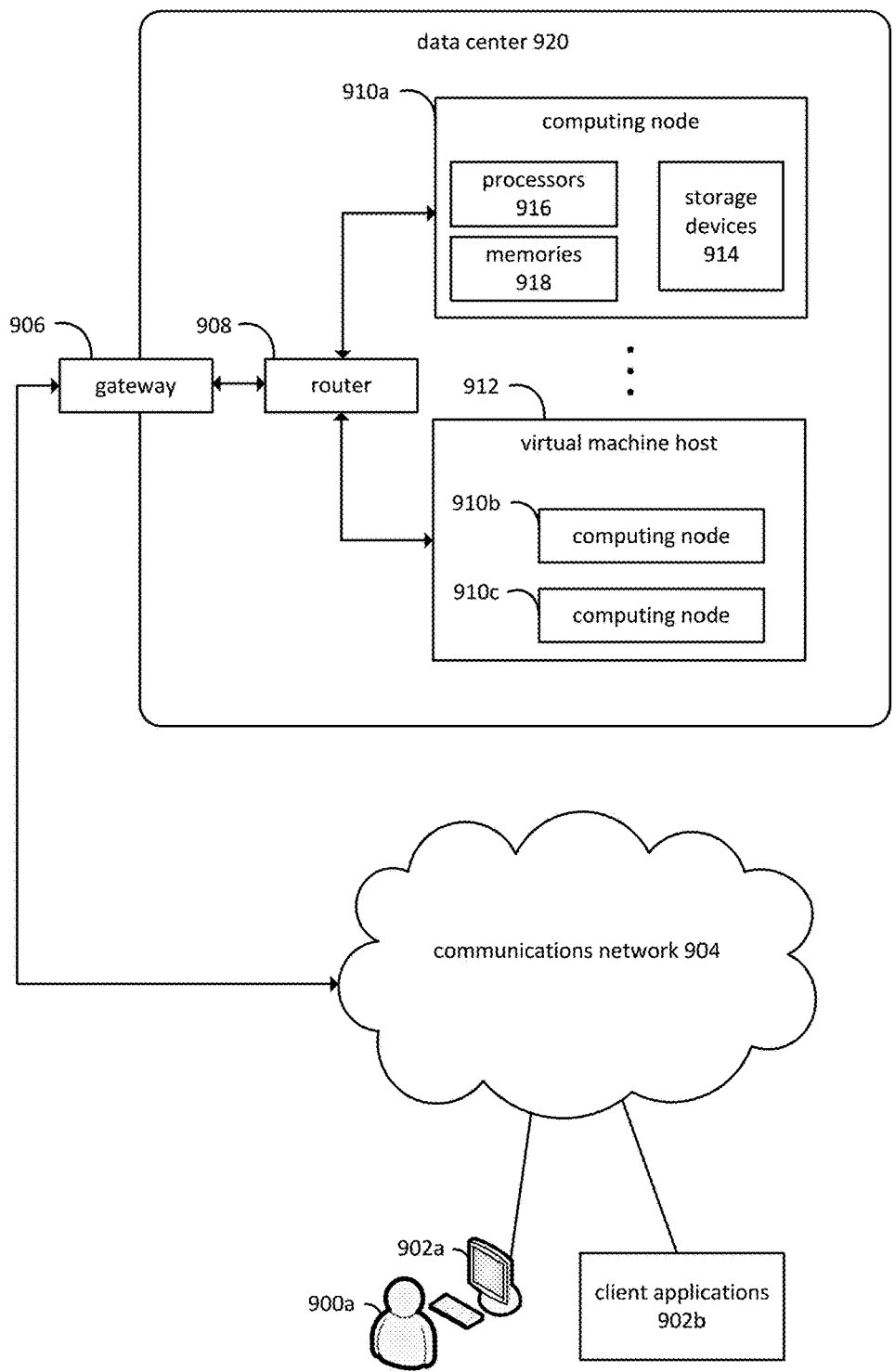
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900a may interact with various client applications, operating on any type of computing device 902a, to communicate over communications network 904 with processes executing on various computing nodes 910a, 910b, and 910c within a data center 920. Alternatively, client applications 902b may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910a, 910b, and 910c, operating within data center 920, may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910a, 910b, and 910c. Some of these intermediate layers may themselves comprise processes executing on one or more of the computing nodes. Computing nodes 910a, 910b, and 910c, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910a is depicted as residing on physical hardware comprising one or more processors 916, one or more memories 918, and one or more storage devices 914. Processes on computing node 910a may execute in conjunction with an operating system or alternatively may execute as a bare-metal process that directly interacts with physical resources, such as processors 916, memories 918, or storage devices 914.

Computing nodes 910b and 910c are depicted as operating on virtual machine host 912, which may provide shared access to various physical resources, such as physical processors, memory, and storage devices. Any number of virtualization mechanisms might be employed to host the computing nodes.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 10:
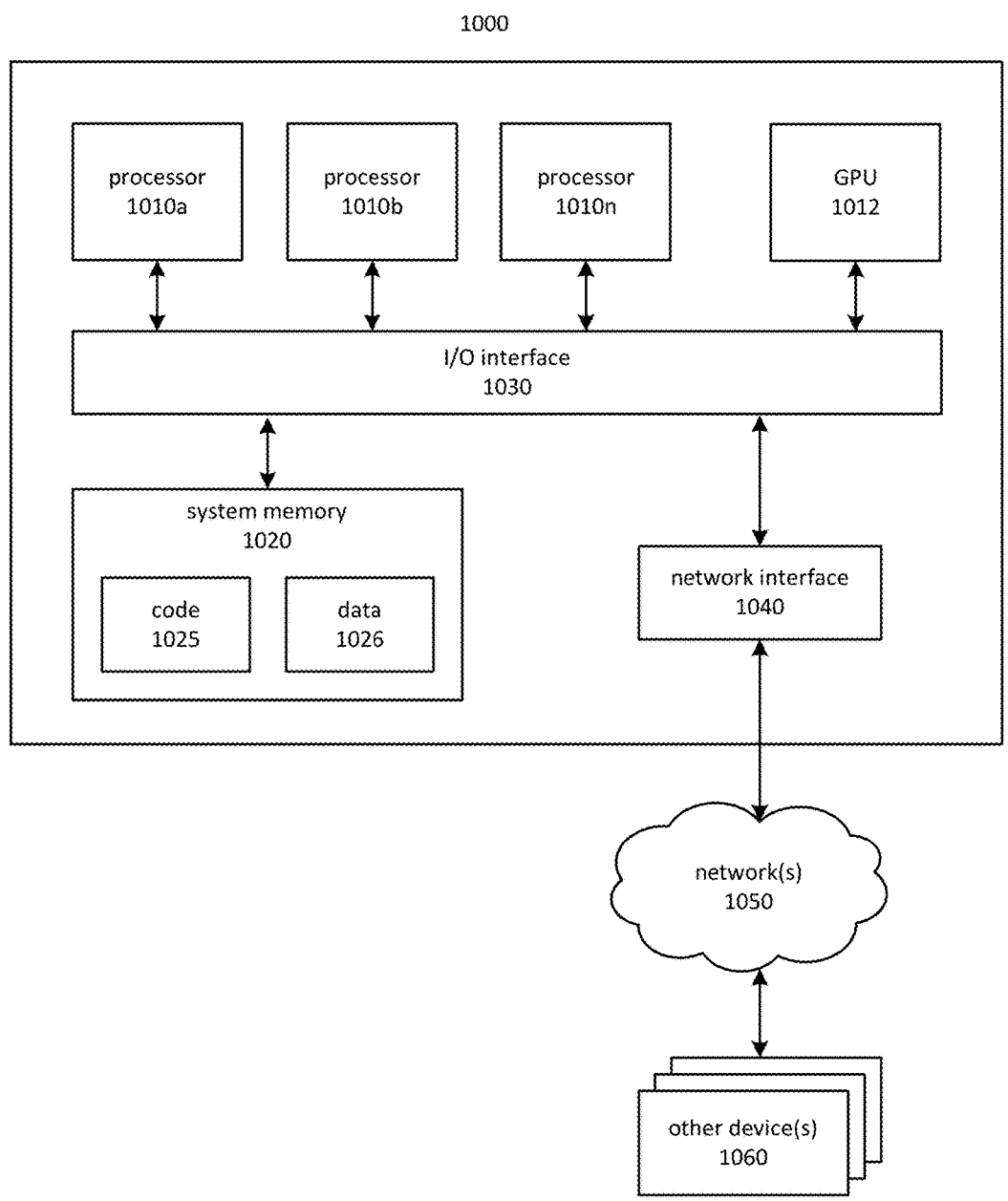
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010a, 1010b, and/or 1010n (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 900 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1010 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   one or more processors;
   one or more memories having stored thereon computer-executable instructions that, upon execution by the one or more processors, cause the system to at least:
   receive a first diagnostic information associated with execution of a computing function on one or more computing nodes;
   determine that the first diagnostic information is indicative of an operational state, wherein the operational state is indicative of an elevated risk of an error condition compared to other operational states;
   receive a second diagnostic information associated with the execution of the computing function;
   identify a first property indicative of a subset of the second diagnostic information, based at least in part on the operational state;
   identify a subset of the second diagnostic information that is associated with the first property;
   store the identified subset of the second diagnostic information; and
   discard second diagnostic information not in the identified subset.

2. The system of claim 1, wherein the subset of the second diagnostic information comprises output of one or more trace statements associated with the first property.

3. The system of claim 1, wherein the one or more memories have stored thereon further computer-executable instructions that, upon execution by the one or more processors, cause the system to at least:
   send, to the one or more computing nodes, information indicative of outputting, during execution of the computing function, diagnostic information associated with the first property.

4. The system of claim 1, wherein the one or more memories have stored thereon further computer-executable instructions that, upon execution by the one or more processors, cause the system to at least:
   receive a request to associate a set of rules with the computing function; and
   apply the set of rules to the first diagnostic information to determine that the first diagnostic information is indicative of the operational state.

5. A method comprising:
   receiving a first information associated with execution of a computing function on one or more computing nodes;
   receiving a second information associated with the execution of the computing function, wherein a first subset of the second information is linked to a first identifier;
   determining that the first information is indicative of an operational state associated with the execution of the computing function; and
   causing the first subset of the second information to be stored in response to determining that the first information is indicative of the operational state and determining that the operational state is associated with the first identifier.

6. The method of claim 5, wherein the second information corresponds to one or more trace statements executed during execution of the computing function.

7. The method of claim 6, wherein at least one of the one or more trace statements comprises a reference to the first identifier.

8. The method of claim 5, further comprising:
   sending to the one or more computing nodes, in response to determining that the first information is indicative of the operational state, instructions to output diagnostic information linked to the first identifier.

9. The method of claim 5, further comprising:
   determining, based at least in part on a set of rules associated with the computing function, that the first information is indicative of the operational state and that the operational state is associated with the first identifier.

10. The method of claim 9, wherein the computing function and the set of rules is provided by a client of a provider operating the one or more computing nodes.

11. The method of claim 5, further comprising:
    determining that the first information is correlated to the second information based at least in part on comparing information indicative of a first time associated with the first information to a second time associated with the second information.

12. The method of claim 5, wherein the first identifier is indicative of an amount of diagnostic information to generate and is referenced by trace statements included in the computing function.

13. The method of claim 5, wherein the first information is read from a log file.

14. The method of claim 5, further comprising:
invoking a second computing function in response to determining that the first information is indicative of the operational state; and
determining that the operational state is associated with the first identifier based at least in part on the invoking.

15. A non-transitory computer-readable storage medium having stored thereon executable instructions that, upon execution by a computing device, cause the computing device at least to:
receive a first set of diagnostic data associated with execution of a computing function on one or more computing nodes;
receive a second set of diagnostic data associated with the execution of the computing function;
determine that the first set of diagnostic data is indicative of an operational state associated with the execution of the computing function and that the operational state is associated with a first identifier; and
in response determining that the first set of diagnostic data is indicative of the operational state, provide to a client device diagnostic data of the second set of diagnostic data that is associated with the first identifier.

16. The non-transitory computer-readable storage medium of claim 15, comprising further instructions that, upon execution by the computing device, cause the computing device at least to:
receive information indicative of a request to link the computing function to a set of rules, the set of rules comprising information usable to determine that the first set of diagnostic data is indicative of the operational state.

17. The non-transitory computer-readable storage medium of claim 15, comprising further instructions that, upon execution by the computing device, cause the computing device at least to:
determine that the first set of diagnostic data is indicative of the operational state by applying one or more rules to the first set of diagnostic data.

18. The non-transitory computer-readable storage medium of claim 15, wherein the operational state comprises at least one of uncharacteristic processor utilization, uncharacteristic network utilization, or uncharacteristic throughput.

19. The non-transitory computer-readable storage medium of claim 15, wherein the operational state comprises an exception raised during execution of the computing function.

20. The non-transitory computer-readable storage medium of claim 15, comprising further instructions that, upon execution by the computing device, cause the computing device at least to:
stop storing information in the second set of diagnostic data in response to at least one of determining that the operational state has ended or a threshold period of time has elapsed.

* * * * *